United States Patent
Hart et al.

(10) Patent No.: US 8,594,727 B2
(45) Date of Patent: Nov. 26, 2013

(54) MOBILE DEVICE INPUT/OUTPUT INTERFACE EXPANSION DEVICE AND SYSTEM HAVING THE SAME

(75) Inventors: Peter E. Hart, Menlo Park, CA (US); Xu Liu, Cupertino, CA (US); Ken Gudan, Sunnyvale, CA (US); Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 574 days.

(21) Appl. No.: 12/880,475

(22) Filed: Sep. 13, 2010

(65) Prior Publication Data

US 2012/0064829 A1    Mar. 15, 2012

(51) Int. Cl.
*H04M 1/00* (2006.01)

(52) U.S. Cl.
USPC ........ 455/556.1; 455/557; 455/3.06; 709/242

(58) Field of Classification Search
USPC .............. 455/556.1, 557, 3.06, 66.1, 566, 74, 455/344; 709/242, 224, 202, 229
See application file for complete search history.

(56) References Cited

U.S. PATENT DOCUMENTS

| | | | |
|---|---|---|---|
| 6,912,206 B1* | 6/2005 | Valentine et al. | 370/255 |
| 7,194,534 B2* | 3/2007 | Valentine et al. | 709/224 |
| 7,636,320 B1* | 12/2009 | Taylor et al. | 370/252 |
| 7,987,289 B2* | 7/2011 | Mason et al. | 709/242 |
| 8,306,729 B2* | 11/2012 | Liu | 701/400 |
| 8,368,723 B1* | 2/2013 | Gossweiler et al. | 345/660 |
| 2001/0029536 A1* | 10/2001 | Valentine et al. | 709/224 |
| 2010/0039955 A1* | 2/2010 | Taylor et al. | 370/252 |
| 2010/0293608 A1* | 11/2010 | Schechter et al. | 726/8 |
| 2011/0047204 A1* | 2/2011 | Mansoor et al. | 709/202 |
| 2011/0275360 A1* | 11/2011 | Sample et al. | 455/422.1 |
| 2012/0166582 A1* | 6/2012 | Binder | 709/217 |
| 2012/0304152 A1* | 11/2012 | Baldwin et al. | 717/120 |
| 2013/0054634 A1* | 2/2013 | Chakraborty et al. | 707/769 |

* cited by examiner

*Primary Examiner* — Minh D Dao

(74) *Attorney, Agent, or Firm* — Blakely, Sokoloff, Taylor & Zafman LLP

(57) ABSTRACT

A method and apparatus is disclosed herein for providing an I/O extension for a mobile device. In one embodiment, the apparatus comprises: a first interface to the mobile device; a second interface to a cloud; a third interface to a display device; a fourth interface to one or more user input devices; and a controller, coupled to the first, second, third and fourth interfaces, to coordinate information exchange between the mobile device, the cloud and the one or more user input devices to enable display on the display device of data from the mobile device and the cloud, including full-resolution rendered web pages from a full browser running on the mobile device.

22 Claims, 2 Drawing Sheets

Full Browser Renders To Large Display Through Cloud Port

Cloud Port System Overview

Full Browser Renders To Large Display Through Cloud Port

Power Flow In The Cloud Port System

System Architecture Of Cloud Port System

MOBILE DEVICE INPUT/OUTPUT INTERFACE EXPANSION DEVICE AND SYSTEM HAVING THE SAME

FIELD OF THE INVENTION

The present invention relates to the field of mobile devices; more particularly, the present invention relates to expanding the input/output connections to a cloud and other input/output devices.

BACKGROUND OF THE INVENTION

Cloud computing has made it possible to travel without a computer. Users can access all their data (e.g., emails, documents, Excel sheets, images, etc.) and leverage the cloud's processing power, all through a simple web browser. At the same time, mobile phones (e.g., iPhone, Android, Windows Mobile, etc.) have become very powerful and in a lot of cases may substitute laptops/desktops. However, mobile phones cannot be made much larger than a palm size and cannot have a full keyboard, and therefore have very limited input/output (I/O) bandwidth. Internet browsing on the phone is not easy since most of the web pages and web applications are designed for large screens, while the rendering system on the phone is designed for the small screen, and simply mirroring the phone screen onto a large display will not benefit from the full resolution of the large display. Furthermore, typing on a small phone keyboard is awkward and very inefficient. If the I/O problem is solved for the phone, it is then possible to travel and work with only a mobile phone. That is, the office can be in your pocket.

SUMMARY OF THE INVENTION

A method and apparatus is disclosed herein for providing an I/O extension for a mobile device. In one embodiment, the apparatus comprises: a first interface to the mobile device; a second interface to a cloud; a third interface to a display device; a fourth interface to one or more user input devices; and a controller, coupled to the first, second, third and fourth interfaces, to coordinate information exchange between the mobile device, the cloud and the one or more user input devices to enable display on the display device of data from the mobile device and the cloud, including full-resolution rendered web pages from a full browser running on the mobile device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
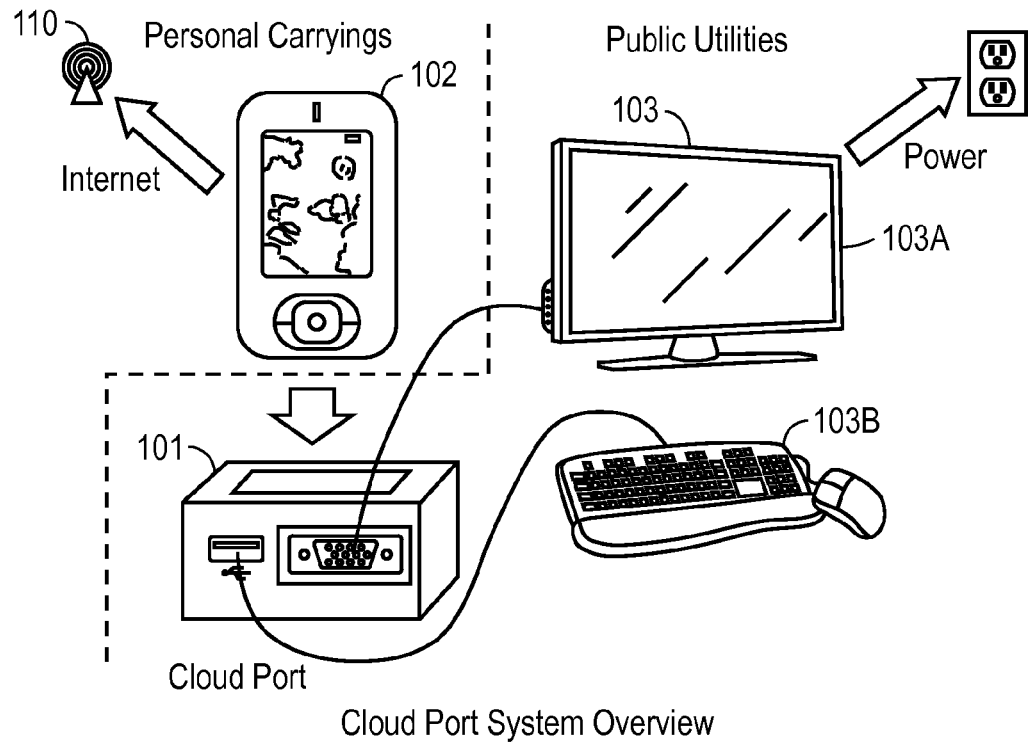
FIG. 1 is a block diagram of one embodiment of a cloud port system.

A cloud port and system for including the same are disclosed. In one embodiment, the cloud port provides a 3-way connection between a mobile device (e.g., a mobile phone, PDA, iPod, iPad, etc.), a cloud and a public input/output (I/O) utility. In one embodiment, a public I/O utility comprises a large display and keyboard (or other input device). Such a public I/O utility may be available at various locations (e.g., businesses, retail establishments, hotels etc.) and may free usable to any user with a mobile device. The 3-way connection enables the mobile device to access resources from the cloud as well as exchange information with the display and the keyboard. Access to a large display and full keyboard via the cloud port alleviates problems of the prior art discussed above.

Although the cloud port enables the exchange of information between the mobile device and the public I/O utility, in one embodiment, security and privacy with respect to the information exchanged is maintained because there is no session specific persistent storage in the cloud port. More specifically, when the mobile device is connected to (e.g., plugged into) the cloud port a session is started and information may be exchanged. Subsequently, when the mobile device is disconnected (e.g., unplugged) from the cloud port, all memory is cleared. In this manner, a session is generated per "plug" event and invalidated per "unplug" event, such that the mobile device acts as a system switch that controls when information exchanged within the cloud port is stored and maintained.

In one embodiment, the cloud port balances the computation and communication between the mobile device, the cloud and the local I/O devices (e.g., a display) of the public I/O utility. For example, after the mobile device is connected to the cloud port interface, information is exchanged with the cloud port. With this knowledge and the knowledge of the bandwidth of the cloud and the public I/O utility, the cloud port can determine what facilities (e.g., audio/video decoders) are on chip and allow services of the cloud to be used by the mobile phone accordingly. For example, if the cloud port itself has a landline connection with higher bandwidth than the mobile phone network, it will use the landline connection. As another example, if the local display has hardware video decoder (H.264 for example), the cloud port will send binary video data to local display to render, instead of rendering on the phone and sending to display. In both of these examples, a controller in the cloud port performs the determination and sees that the data is routed accordingly.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In one embodiment, a cloud port is operable to connect a mobile phone to large screen display and full keyboard and mouse. FIG. 1 illustrates one embodiment of a system having a cloud port. Referring to FIG. 1, the connection between mobile phone 102 and the full size public I/O utility 103 is made by a connector box, referred to as cloud port 101. In one embodiment, public I/O utility 103 comprises a display 103A and a keyboard/mouse 103B. Note that although a mobile phone is shown in FIG. 1, other mobile devices may be used, such as, but limited to, a PDA, iPod, iPad, etc.

The system of FIG. 1 is designed for mobile workers. In one embodiment, whenever someone plugs mobile phone 102 into cloud port 101, a full browser starts to run on mobile phone 102 and cloud port 101 projects the rendering of the browser onto display 103A. In one embodiment, mobile phone 102 starts the full browser in response to exchanging information with cloud port 101 that signals mobile phone 102 that it is connected to cloud port 101. Note that the cloud will understand the browser running on mobile phone to be a full browser because all information provided to the cloud port to be sent to the cloud indicates to the cloud that it is dealing with a full browser (as opposed to a more limited browser on a mobile device); in essence, the mobile phone spoofs the cloud into thinking it's a device with a full browser. To interact with the browser, data from keyboard + mouse input devices 103B are relayed to mobile phone 102 to control the browser.

In one embodiment, the browser that runs when mobile phone 102 is plugged into cloud port 101 is not the default phone browser. It is a full browser and it is aware of the cloud port connection. In one embodiment, the full browser is spoofing the cloud into thinking that it is a full browser running on a personal computer (PC) with a large display and keyboard + mouse. In one embodiment, the full browser does the spoofing by sending a fake user-agent, for example:
Mozilla/5.0 (Windows; U; Windows NT 6.0; en-US) AppleWebKit/533.4 (KHTML, like Gecko) Chrome/5.0.375.125 Safari/533.4
Thus, the browser lies about being on Windows NT, which is the cell phone operating system.

In one embodiment, to determine that the phone is connected to a cloud port, the browser probes via the cloud port interface (e.g., a USB connector) to acquire the device ID connected to the phone's USB port, and only launches when the device ID matches the identity of cloud port.

Figure 2:
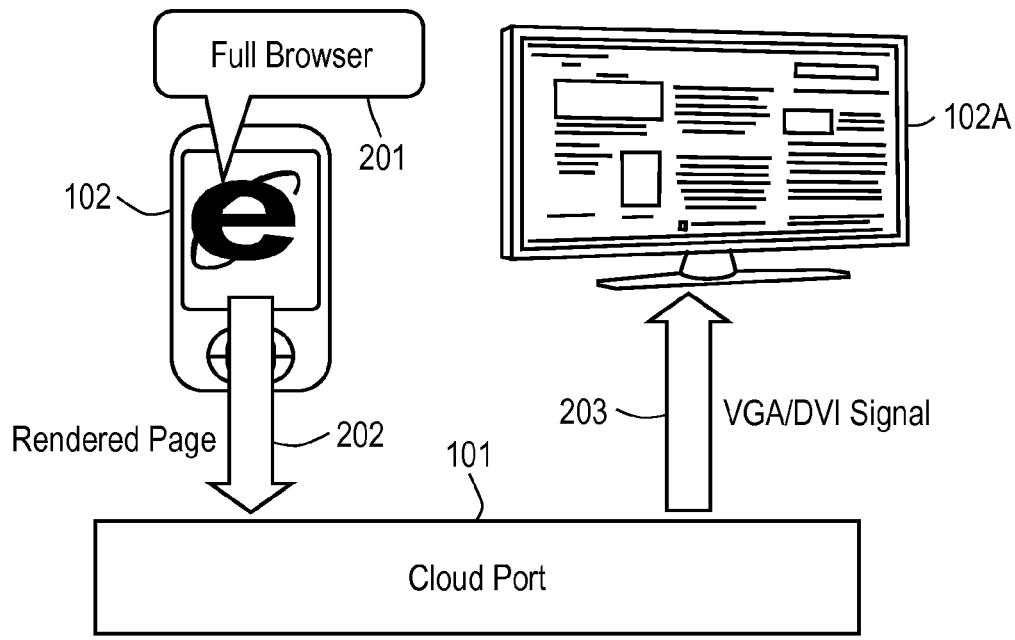
FIG. 2 illustrates a full browser rendering to large display through a cloud port in accordance with one embodiment of the present invention.

The browser renders a web page and sends the rendering to cloud port 101. FIG. 2 illustrates the process. Referring to FIG. 2, a full browser 201 running on mobile device 102 generates a rendered page 202 and sends rendered page 202 to cloud port 102. Cloud port 102 receives rendered page 202 and translates the rendering into standard VGA/DVI signals 203, which projects rendered page 202 onto display 103A.

In one embodiment, cloud port 101 uses standard VGA/DVI to interface with display 103A and standard USB to interface with keyboard + mouse input devices 103B. In one embodiment, cloud port 101 is not physically separate from display 103A, but could be integrated with the larger display, with a convenient docking connector or simple docking port into which mobile phone 102 can be plugged.

Figure 3:
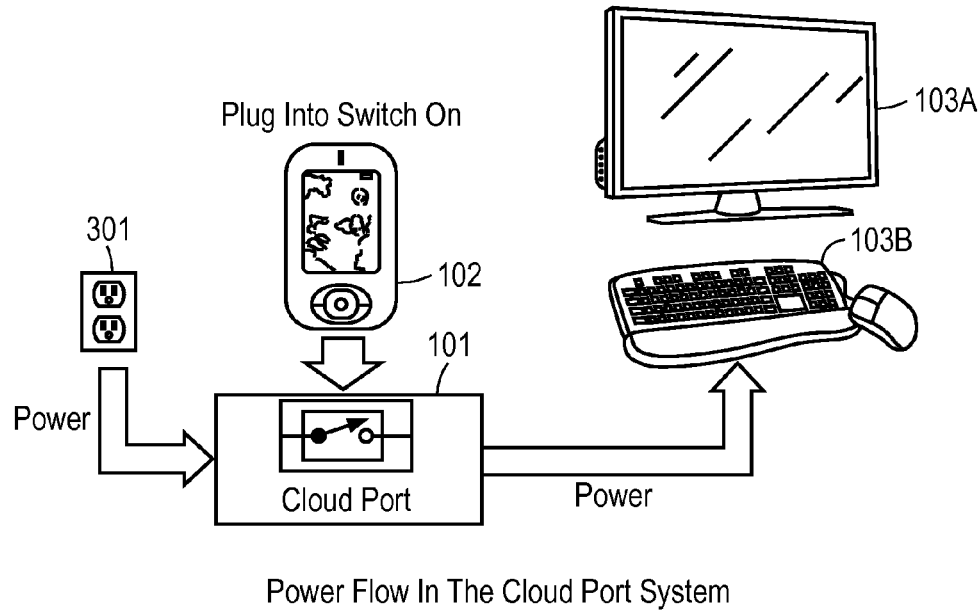
FIG. 3 illustrates one embodiment of the power flow in one embodiment of a cloud port system.

As discussed above, the cloud port system is designed for mobile workers in that no machine is dedicated for use by a specific user. The I/O devices of the public utility, namely, display 103A and keyboard + mouse input devices 103B are provided as a public utility. Anyone may plug a phone into cloud port 101 and start using it. In one embodiment, privacy is address by ensuring cloud port 101 does not maintain session specific persistent storage. For example, a user's web history is not saved in the system and thus cannot be accessed by another. In one embodiment, this is achieved through power control. Such an arrangement is shown in FIG. 3. Referring to FIG. 3, the complete cloud port system, including display 103A and keyboard 103B are powered through mobile phone 102. Specifically, the power to cloud port 102 is provided from a dedicated wall outlet 301, but is looped through a switch on cloud port 101 controlled by mobile phone 102. When mobile phone 102 is unplugged, the system powers down and clears memories of cloud port 101 of any session specific data. This may be done by running software on cloud port 101. Thus, after mobile device 102 has been disconnected from cloud port 101, there is no hard drive, flash memory where document data is stored, or any type of persistent memory in the system storing session specific data, except the minimum required to drive a display or USB bus (no user data ever touches this memory).

An Example of a Cloud Port Embodiment

In one embodiment, the cloud port comprises a first interface to the mobile device, a second interface to a cloud, a third interface to a display device, a fourth interface to one or more user input devices; and a controller, coupled to these interfaces. The controller coordinates information exchange between the mobile device, the cloud and the one or more user input devices to enable display on the display device of data from the mobile device and the cloud, including full-resolution rendered web pages from a full browser running on the mobile device. In an alternative embodiment, the cloud port does not have a wired connection (e.g., a land line) to the cloud and access to the cloud by the mobile phone is through the wireless network employed by the phone.

In one embodiment of the system, the keyboard, mouse and display that may be coupled to the interfaces of the cloud port are off the shelf devices with standard USB and VGA/DVI connections. The USB interface on the mobile phone runs in host mode so multiple USB peripherals can connect to it. Keyboard and mouse events are directly sent to the browser running on the mobile phone and the browser will change its rendering accordingly. The rendered web page is also sent through the USB host on the mobile phone to the display. In one embodiment, the cloud port emulates a USB peripheral to receive the rendered page. The received rendering is converted to a VGA/DVI signal and passed to the standard video interface.

In one embodiment, a session is created between the controller and the mobile device in response to the mobile phone being connected to its cloud port interface (e.g., a USB interface). In one embodiment, a session is created per plug-in event. That is, each time the mobile phone is connected to the cloud port interface, a session is created. The session becomes invalid when the mobile phone is disconnected from the cloud port interface.

In one embodiment, when the mobile phone connects to the cloud port interface, the mobile phone identifies itself to the cloud port. In response to the mobile phone being connected to the cloud port interface (e.g., a USB interface), the cloud port controller generates a key pair that pairs the cloud and public utility with the mobile phone. The key pair is used to enable services of the cloud rendered on behalf of the mobile device through the controller to the display (public I/O utility). A different key pair is used for each different session or each different time the mobile phone is connected to the cloud port interface. In one embodiment, the controller in the cloud port generates the key pair. The key pair may include a random number that is coupled with the cloud port's device ID, so two cloud ports will not have the same key. In one embodiment, this key pair also pairs the cloud to the display provided the service in the cloud knows of the existence of the cloud port and any encryption used by cloud port.

In one embodiment, the session specific information exchanged between the mobile device, the cloud and the one or more user input devices does not remain persistent in the apparatus in response to the mobile device being disconnected from its interface (e.g., a USB interface) with the cloud port. The cloud port controller recognizes that the mobile phone is no longer connected and may power itself down or power down any memory that stored session specific data exchanged through the cloud port while the mobile device was connected, thereby eliminating any such session specific data. In another embodiment, the cloud port controller or another component on the cloud port runs a utility to erase any such data.

Also when the mobile device is disconnected from the cloud port interface, the mobile phone signals the cloud in response to being disconnected from the cloud port interface to signal the cloud to stop sending any additional data to the apparatus for the session with the mobile phone. In one embodiment, the mobile phone signals the cloud using via a wireless network provider. In another embodiment, the mobile phone signals the cloud using the controller. For example, the mobile phone may signal the cloud via the controller in the cloud port using Bluetooth. Note that any other side channel could be used to notify the cloud that the mobile device is no longer connected to the cloud port. Regardless of the communication path to the cloud, the mobile phone identifies itself to the cloud (when it is no longer connected to the cloud port) using a session identifier (ID) or a key of a key pair.

Figure 4:
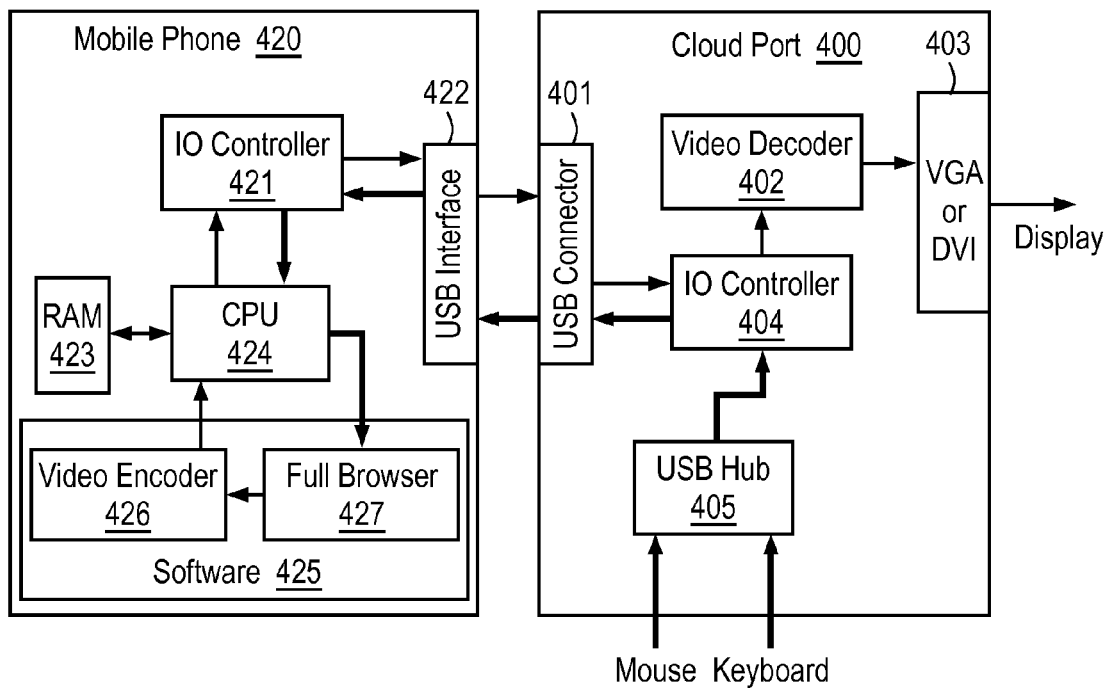
FIG. 4 is one embodiment of a system architecture of a cloud port system.

FIG. 4 illustrates a more detailed hardware and software design of one embodiment of a cloud port system. Referring to FIG. 4, mobile phone 420 comprises an IO controller 410 coupled to exchange information between USB interface 422 and CPU 424. A memory 423 (e.g., random access memory (RAM)) is coupled to CPU 424. CPU 424 runs software 425 (along with other software to run the basic functionality of phone 420). In one embodiment software 425 comprises video encoder 426 and full browser 427.

In one embodiment, cloud port 400 comprises an I/O controller 404 coupling an interface 401 (e.g., a USB connector) that connects to mobile phone 420, a user input device interface (e.g., USB hub) that connects to a mouse and keyboard (public I/O utility), and a display interface 403 (e.g., a VGA interface, DVI interface, etc.) that connects to a display (public I/O utility). In one embodiment, I/O controller 404 is coupled to display interface 403 via a video decoder 402. Controller 404 may comprise hardware (e.g., dedicated logic, circuitry, etc.), software (such as is run on a general purpose computer system or a dedicated machine), or a combination of both.

In one embodiment, in order to reduce (and potentially minimize) the changes to mobile phone 420, only software modules are added to the phone. A full browser 427 is running on phone 420, using the phone's CPU 424 and memory 420 (which is sufficient for web browsers). The software reads and writes to USB interface (port) 422 on phone 420.

In one embodiment, instead of rendering to the phone screen (not shown), browser 427 renders to software video encoder 426, which produces encoded frames that are sent to USB interface 422 on phone 420. This may be important when a full-resolution browser is generating web pages and the available bandwidth necessitates its use. In one embodiment, video encoder 426 performs a standardized encoding such as, for example, H.264 or MPEG-4, to generate a video stream in a standardized format that cloud port 400 is able to decode. Note that other standard or non-standard encoding may be employed by the mobile phone.

When cloud port 400 receives the encoded video stream through USB connector 401, a video decoder 402 ports the stream to standard VGA or DVI signals and out to a display. In one embodiment, video decoder 402 comprises a hardware decoder (e.g., ASIC, FPGA, or microcontroller). The encoding could be with or without compression depending on the bandwidth and the rendering resolution.

Also note that in one embodiment, a video encoder in the mobile phone and the video decoder in the cloud port are not used when transferring data between the mobile phone and the cloud port. For example, the mobile phone may send RGB values corresponding to the web pages or other data that is being sent to the cloud port.

In other embodiments, if the cloud is returning data to the mobile phone through the cloud port, the data may be rendered from the cloud directly to the display through the cloud port without the use of the mobile device supplying the data. This may be useful when the cloud port is connected to the cloud over a wired interface (e.g., a land line). For example, if the mobile device has requested video from the cloud, then the video may be decoded by the cloud port's video decoder directly without having to be processed by the mobile phone. In one embodiment, the cloud port knows that it is receiving video in the data that the mobile phone requested (and then can display that video) based on specific suffixes or tags in the data. More specifically, usually the multimedia contents has a specific suffix in the URL, for example, ogg (theora/vorbis), mp4/mov (h.264), WebM (VP8/vorbis), flv (flash movie). In one embodiment, when a full browser is running with cloud port 400, when browser 427 parses the HTML and encounters, for example, a .mov file and tries to utilize (H.264 hardware) decoder 402 to decode it. If the media stream has no suffix, browser 427 may parse the binary stream to identify the media type and then find the best hardware to render it. In general, multimedia content rendering can all benefit from hardware acceleration, including flash animation, graphics, audio and video. Note that HTML5 gives dedicated tags to identify these multimedia contents, and these tags can be used to identify content.

In one embodiment, the rendering resolution of browser 427 is adjusted according to the display capability. In one embodiment, similar to plugging a laptop to a VGA projector, the rendered the resolution cannot be higher than supported by the display, and it cannot exceed the video buffer size on the phone. Browser 427 has to send proper resolution of renderings to the display at a frequency the display can afford (normally 60 Hz or higher).

When plugged into cloud port 400, browser 427 is controlled by external keyboard + mouse events relayed through cloud port 400 via USB hub 405. When phone 420 is unplugged from cloud port 400, cloud port 400 is shut down (because the power loopback switch of FIG. 3 is opened) and all data is erased, but browser 427 saves the last configuration (e.g., opened web pages, cookies and caches). In this way, when phone 420 is plugged into another cloud port, browser 427 can resume from when it was last shut down.

Although not shown, in one embodiment, the cloud port has other components. For example, the cloud port comprises a communication mechanism or bus for communicating information, a processor coupled with bus for processing information, and a random access memory (RAM) or other dynamic storage device (referred to as main memory) coupled to the bus for storing information and instructions to be executed by processor. Note that the processor may be part of, or separate from, controller 404. The cloud port may also comprise a read only memory (ROM) and/or other static storage device coupled to the bus for storing static information and instructions for the processor.

Controller 404 may perform load balancing. In one embodiment, this may be performed by measuring the cell phone and the cloud port's CPU speed, graphics speed, and network bandwidth. Using this information, controller 404 may decide to use hardware acceleration. For example, the cloud port may have built-in video acceleration card or it may find a video acceleration card from the display. If there is no hardware acceleration on phone 420 or cloud port 400, controller 404 may determine, and thus cause, some very large rendering task to be off-loaded to the cloud. After rendering, in one embodiment, cloud port 400 downloads the graphics via a landline since it is cheaper and faster than the mobile phone network.

Note that any or all of the components of the cloud port of FIG. 4 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus that operates as an extension for a mobile device, the apparatus comprising:
 a first interface to the mobile device;
 a second interface to a cloud;
 a third interface to a display device;
 a fourth interface to one or more user input devices; and
 a controller, coupled to the first, second, third and fourth interfaces, to coordinate information exchange between the mobile device, the cloud and the one or more user input devices to enable display on the display device of data from the mobile device and the cloud, including full-resolution rendered web pages from a full browser running on the mobile device, wherein the mobile device comprises a hand-held mobile device and the full browser running on the hand-held mobile device is a non-mobile browser.

2. The apparatus defined in claim 1 wherein the information exchanged between the mobile device, the cloud, the display device and the one or more user input devices does not remain persistent in the apparatus in response to the mobile device being disconnected from the first interface.

3. The apparatus defined in claim 1 wherein a session is created between the controller and the mobile device in response to the mobile device being connected to the first interface, the session becoming invalid in response to the mobile device being disconnected from the first interface.

4. The apparatus defined in claim 3 wherein the controller generates a key pair that pairs cloud with the mobile device in response to the mobile device being connected to the first interface, the key pair used to enable services of the cloud rendered on behalf of the mobile device through the controller to the display.

5. The apparatus defined in claim 1 wherein the mobile device decides which services of the cloud to use.

6. The apparatus defined in claim 5 wherein the mobile device decides which services of the cloud to use based on one or more selected from a group consisting of: affordances of display, network conditions, cost to implement at the display, and hardware acceleration of display.

7. The apparatus defined in claim 1 wherein the first interface comprises a USB interface, and the browser renders web pages to a USB port on the mobile device that is connected to the first interface.

8. The apparatus defined in claim 7 further comprising a video decoder to decode encoded data received from the mobile device via the first interface and send decoded data to the third interface for display on the display.

9. The apparatus defined in claim 1 wherein the first interface comprises a USB interface, the second interface comprises a wired interface, the third interface comprises a VGA or DVI interface, and the fourth interface comprise a USB interface, and the one or more input devices comprise one or more of a group consisting of a keyboard, a mouse, and a cursor control device.

10. The apparatus defined in claim 1 wherein the controller interfaces to the third interface via a video decoder.

11. An apparatus that operates as an extension for a mobile device, the apparatus comprising:
   a first interface to the mobile device;
   a second interface to a cloud;
   a third interface to a display device;
   a fourth interface to one or more user input devices; and
   a controller, coupled to the first, second, third and fourth interfaces, to coordinate information exchange between the mobile device, the cloud and the one or more user input devices to enable display on the display device of data from the mobile device and the cloud, including full-resolution rendered web pages from a full browser running on the mobile device, wherein the information exchanged between the mobile device, the cloud, the display device and the one or more user input devices does not remain persistent in the apparatus in response to the mobile device being disconnected from the first interface, and wherein the mobile device signals the cloud in response to being disconnected from the first interface to signal the cloud to stop sending any additional data to the apparatus for the session with the mobile device.

12. The apparatus defined in claim 11 wherein the mobile device signals the cloud via a wireless network provider.

13. The apparatus defined in claim 11 wherein the mobile device signals the cloud via the controller.

14. The apparatus defined in claim 13 wherein the mobile device signals the cloud via the controller using Bluetooth.

15. An apparatus that operates as an extension for a mobile device, the apparatus comprising:
   a first interface to the mobile device;
   a second interface to a cloud;
   a third interface to a display device;
   a fourth interface to one or more user input devices; and
   a controller, coupled to the first, second, third and fourth interfaces, to coordinate information exchange between the mobile device, the cloud and the one or more user input devices to enable display on the display device of data from the mobile device and the cloud, including full-resolution rendered web pages from a full browser running on the mobile device, wherein the mobile device decides which services of the cloud to use, and wherein the controller balances computation and communication between the mobile device, the cloud and the input devices.

16. A system comprising:
   a mobile device that comprises a hand-held mobile device to run a non-mobile browser;
   an apparatus having
      a first interface to the mobile device,
      a second interface to a cloud,
      a third interface to a display device,
      a fourth interface to one or more user input devices, and
      a controller, coupled to the first, second, third and fourth interfaces, to coordinate information exchange between the mobile device, the cloud and the one or more user input devices to enable display on the display device of data from the mobile device and the cloud, including full-resolution rendered web pages from the non-mobile browser running on the mobile device.

17. The system defined in claim 16 wherein the information exchanged between the mobile device, the cloud and the one or more user input devices does not remain persistent in the apparatus in response to the mobile device being disconnected from the first interface.

18. The system defined in claim 16 wherein a session is created between the controller and the mobile device in response to the mobile device being connected to the first interface, the session becoming invalid in response to the mobile device being disconnected from the first interface.

19. A system comprising:
   a mobile device;
   an apparatus having
      a first interface to the mobile device,
      a second interface to a cloud,
      a third interface to a display device,
      a fourth interface to one or more user input devices, and
      a controller, coupled to the first, second, third and fourth interfaces, to coordinate information exchange between the mobile device, the cloud and the one or more user input devices to enable display on the display device of data from the mobile device and the cloud, including full-resolution rendered web pages from a full browser running on the mobile device, wherein the information exchanged between the mobile device, the cloud and the one or more user input devices does not remain persistent in the apparatus in response to the mobile device being disconnected from the first interface, and wherein
   the mobile device signals the cloud in response to being disconnected from the first interface to signal the cloud to stop sending any additional data to the apparatus for the session with the mobile device.

20. The system defined in claim 19 wherein the mobile device signals the cloud via a wireless network provider.

21. The system defined in claim 19 wherein the mobile device signals the cloud via the controller.

22. The system defined in claim 21 wherein the mobile device signals the cloud via the controller using Bluetooth.

* * * * *